US007426557B2

(12) United States Patent
Gruhl et al.

(10) Patent No.: US 7,426,557 B2
(45) Date of Patent: Sep. 16, 2008

(54) SYSTEM, METHOD, AND SERVICE FOR INDUCING A PATTERN OF COMMUNICATION AMONG VARIOUS PARTIES

(75) Inventors: Daniel Frederick Gruhl, San Jose, CA (US); Ramanathan Valdhyanath Guha, Los Altos, CA (US); Andrew S. Tomkins, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 10/847,113

(22) Filed: May 14, 2004

(65) Prior Publication Data

US 2005/0256949 A1    Nov. 17, 2005

(51) Int. Cl.
*G06F 17/27* (2006.01)
*G06F 17/00* (2006.01)
(52) U.S. Cl. ............................ 709/223; 704/9; 704/224; 707/5; 707/104.1; 709/224
(58) Field of Classification Search ................. 709/223, 709/224; 704/9, 224
See application file for complete search history.

(56) References Cited

U.S. PATENT DOCUMENTS

| 6,052,657 | A  | * | 4/2000 | Yamron et al. ................. 704/9 |
| 6,529,902 | B1 | * | 3/2003 | Kanevsky et al. .............. 704/9 |
| 7,290,048 | B1 | * | 10/2007 | Barnett et al. ................ 709/223 |
| 2005/0033657 | A1 | * | 2/2005 | Herrington et al. ............ 705/26 |
| 2007/0050711 | A1 | * | 3/2007 | Walker et al. ................ 715/530 |

\* cited by examiner

*Primary Examiner*—Bunjob Jaroenchonwanit
*Assistant Examiner*—Sulaiman Nooristany
(74) *Attorney, Agent, or Firm*—Leonard T. Guzman; Jon A. Gibbons; Fleit Gibbons Gutman Bongini & Bianco P.L.

(57) ABSTRACT

A communication pattern inducing system focuses on the propagation of topics amongst a plurality of nodes based on the text of the node rather than hyperlinks of the node. A node could represent a weblog or any other source of information such as person, a conversation, images, etc. The system utilizes a model for information diffusion, wherein the parameters of the model capture how a new topic spreads from node to node. The system further comprises a process to learn the parameters of the model based on real data and to apply the process to real (or synthetic) node data. Consequently, the system is able to identify particular individuals that are highly effective at contributing to the spread of topics.

4 Claims, 5 Drawing Sheets

SYSTEM, METHOD, AND SERVICE FOR INDUCING A PATTERN OF COMMUNICATION AMONG VARIOUS PARTIES

CROSS-REFERENCE TO RELATED APPLICATION

The present application is related to co-pending application, titled "System, Method, and Service for Segmenting a Topic into Chatter and Subtopics," Ser. No. 10/847,084, which is filed on the same date as the present application, commonly assigned herewith to Iternational Business Machines, and which is incorporated herein by reference in its entirety.

FIELD OF THE INVENTION

The present invention generally relates to the propagation of information. More particularly, the present invention pertains to a method of inducing a model of the propagation of discussion topics from person to person through a network such as, for example, the space of all weblogs.

BACKGROUND OF THE INVENTION

The mainstream adoption of the Internet and Web has changed the physics of information diffusion. Until a few years ago, the major barrier for someone who wanted a piece of information to spread through a community was the cost of the technical infrastructure required to reach a large number of people. Today, with widespread access to the Internet, this bottleneck has largely been removed. In this context, personal publishing modalities such as weblogs have become prevalent. Weblogs, or "blogs," are personal online diaries managed by easy-to-use software packages that allow single-click publishing of daily entries. The contents are observations and discussions ranging from the mainstream to the startlingly personal. There are several million weblogs in existence today. The weblogs and linkages between the weblogs are referenced as "blogspace".

Unlike earlier mechanisms for spreading information at the grassroots level, weblogs are open to frequent widespread observation, and thus offer an inexpensive opportunity to capture large volumes of information flows at the individual level. Furthermore, weblogs can be analyzed in the context of current affairs due to recent electronic publication standards that allow gathering of dated news articles from sources such as Reuters and the AP Newswire. Sources such as Reuters and the AP Newswire have enormous influence on the content of weblogs.

Weblogs typically manifest significant interlinking, both within entries and in boilerplate matter used to situate the weblog in a neighborhood of other weblogs that participate in the same distributed conversation. One conventional approach to analyzing information flow blogspace analyzes the "burstiness" of blogs, capturing bursts of activity within blog communities based on an analysis of the evolving link structure. Reference is made to R. Kumar, et al., "On the bursty evolution of blogspace", In *Proc. WWW,* 2003.

Much previous research investigating the flow of information through networks has been based upon the analogy between the spread of disease and the spread of information in networks. This analogy brings centuries of study of epidemiology to bear on questions of information diffusion. Reference is made to N. Bailey, "*The Mathematical Theory of Infectious Diseases and its Applications*", Griffin, London, 2nd edition, 1975. Classical disease-propagation models in epidemiology are based upon the cycle of disease in a host. A person is first susceptible (S) to the disease. If then exposed to the disease by an infectious contact, the person becomes infected (I) (and infectious) with some probability. The disease then runs its course in that host, who is subsequently recovered (R) (or removed, depending on the virulence of the disease).

A recovered individual is immune to the disease for some period of time, but the immunity may eventually wear off. SIR models diseases in which recovered hosts are never again susceptible to the disease as with a disease conferring lifetime immunity, like chicken pox. SIR further models a highly virulent disease from which the host does not recover. SIRS models a situation in which a recovered host eventually becomes susceptible again, as with influenza.

In blogspace, the SIRS model can be applied as follows: a blogger who has not yet written about a topic is exposed to the topic by reading the blog of a friend. She decides to write about the topic, becoming infected. The topic may then spread to readers of her blog. Later, she may revisit the topic from a different perspective, and write about it again.

One conventional approach to propagation of infectious diseases studied an SIR model with mutation, in which a node u is immune to any strain of the disease that is sufficiently close to a strain with which u was previously infected. Reference is made to M. Girvan, et al., "A simple model of epidemics with pathogen mutation", *Phys. Rev. E,* 65(031915), 2002. This approach observes that for certain parameters it is possible to generate periodic outbreaks in which the disease oscillates between periods of epidemic outbreak and periods of calm while it mutates into a new form. In blogspace, one can imagine the mutation of a movie star into a political figure.

Early studies of propagation took place on "fully mixed" or "homogeneous" networks in which contacts of a node are chosen randomly from the entire network. Recent work, however, focuses on more realistic models based on social networks. In a model of small-world networks, one conventional approach to propagation of infectious diseases calculates the minimum transmission probability for which a disease can spread from one seed node to infect a constant fraction of the entire network (known as the epidemic threshold). Reference is made to C Moore, et al., "Epidemics and percolation in small-world networks", *Phys. Rev. E,* 61:5678-5682, 2000. cond-mat/9911492; and D. Watts, et al., "Collective dynamics of "small-world" networks", *Nature,* 393:440-442, 1998.

One conventional approach to modeling epidemic spreading on networks follows a power law, in which the probability that the degree of a node is k is proportional to $k^{-\alpha}$, for a constant $\alpha$ typically between 2 and 3. Many real-world networks have the power law property (reference is made to M. Mitzenmacher, "A brief history of lognormal and power law distributions", In *Allerton Comm. Control Comput.,* 2001], including a social network defined by blog-to-blog links [reference is made to R. Kumar, et al., "On the bursty evolution of blogspace", In *Proc. WWW,* 2003]. Another conventional approach analyzes an SIS model of computer virus propagation in power-law networks, showing that (in stark contrast to random or regular networks) the epidemic threshold is zero, so an epidemic always occurs. Reference is made to R. Pasto-Satorras, et al., "Epidemic spreading in scale-free networks", *Phys. Rev. Letters,* 86(14): 3200-3203, April 2001.

These results of analyses of propagation in power-law networks can be interpreted in terms of the robustness of the network to random edge failure. Suppose that each edge in the network is deleted independently with probability $(1-\epsilon)$. The network is considered "robust" if most of the nodes are still connected. Nodes that remain in the same component as some initiator $v_0$ after the edge deletion process are exactly the same nodes that $v_0$ infects according to the disease transmission model above. The use of viral propagation through power law networks has been considered from the perspective of error tolerance of networks such as the Internet to determine the behavior of the network if a random $(1-\epsilon)$ fraction of the links in the Internet fail. Many researchers have observed that power-law networks exhibit extremely high error tolerance. Reference is made to R. Albert, et al., "Error and attack tolerance of complex networks", *Nature,* 406, Jul. 2000; and B. Bollabas, et al., "Robustness and vulnerability of scale-free random graphs", *Internet Mathematics,* 1(1), 2003.

In blogspace, however, many topics propagate without becoming epidemics, so such a model would be inappropriate. One refinement uses a more accurate model of power-law networks, demonstrating a non-zero epidemic threshold under the SIS model in power-law networks produced by a certain generative model that takes into account the high "clustering coefficient" found in real social networks. Reference is made to V. Eguiluz, et al., "Epidemic threshold in structured scale-free networks", *Physical Review Letters,* 89, 2002. cond-mat/0205439 and D. Watts, et al., "Collective dynamics of "small-world" networks", *Nature,* 393:440-442, 1998. The clustering coefficient is the probability that two neighbors of a node are themselves neighbors.

Another refinement modifies the transmission model by considering the flow of information through real and synthetic email networks under a model in which the probability of infection decays as the distance to the initiator $v_o$ increases. Reference is made to F. Wu, et al., "Information flow in social groups", Manuscript, 2003. Meme outbreaks under this model are typically limited in scope, following behavior of real data. A meme is an idea or a topic that spreads much like a virus through a population. The simulated spread of email viruses has been empirically examined by examining the network defined by the email address books of a user community. Reference is made to M. Newman, et al., "Email networks and the spread of computer viruses", *Phys. Rev. E,* 66(035101), 2002. A further refinement calculates the properties of disease outbreaks, including the distribution of outbreak sizes and the epidemic threshold, for an SIR model of disease propagation. Reference is made to M. Newman, "The spread of epidemic disease on networks", *Phys. Rev. E,* 66(016128), 2002.

The spread of a piece of information through a social network can also be viewed as the propagation of an innovation through the social network. For example, the URL of a website that provides a new, valuable service is such a piece of information. In the field of sociology, there has been extensive study of the "diffusion of innovation" in social networks, examining the role of "word of mouth" in spreading innovations. At a particular point in time, some nodes in the network have adopted the innovation, and others have not.

Two fundamental models for the process by which nodes adopt new ideas have been considered in the literature: threshold models and cascade models. In a threshold model, each node u in the network chooses a threshold $t_u \in [0,1]$, typically drawn from some probability distribution. Reference is made to M. Granovetter, "Threshold models of collective behavior", *American Journal of Sociology,* 83(6): 1420-1443, 1987.

Every neighboring node v of node u has a nonnegative connection weight $w_{u,v}$ so that $$\sum_{v \in \Gamma(u)} w_{u,v} \leq 1$$

and node u adopts if and only if $$t_u \leq \sum_{\text{adopters } v \in \Gamma(u)} w_{u,v}$$

In a cascade model, whenever a node $v \in \Gamma(u)$ that is a social contact of a node u adopts, then node u adopts with some probability $P_{v,u}$. Reference is made to J. Goldenberg, et al., "Talk of the network: A complex systems look at the underlying process of word-of-mouth", *Marketing Letters,* 12(3): 211-223, 2001. In other words, every time a node (person) close to a node u such as node v adopts, there is a chance that node u decides to "follow" node v and adopt as well.

One approach utilizes an "independent cascade model" with a given set of N nodes, some of which have already adopted. Reference is made to J. Goldenberg, et al., "Talk of the network: A complex systems look at the underlying process of word-of-mouth", *Marketing Letters,* 12(3): 211-223, 2001. At the initial state, some non-empty sets of nodes are "activated." At each successive step, some (possibly empty) sets of nodes become activated. The episode is considered over when no new activations occur. The set of nodes are connected in a directed graph with each edge (u, v) labeled with a probability $P_{u,v}$. When node u is activated in step t, each node v that has an arc (u, v) is activated with probability $P_{u,v}$. This influence is independent of the history of all other node activations. Further, if v is not activated in that time step, then u never activates v.

A "general cascade model" generalizes the independent cascade model and simultaneously generalizes the threshold models described above by discharging the independence assumption. Reference is made to D. Kempe, et al., "Maximizing the spread of influence through a social network", In Proc. KDD, 2003. The general cascade model addresses a related problem on social networks with a marketing motivation: assuming that innovations propagate according to such a model, and given a number k, find the k "seed" nodes $S^*_k$ that maximize the expected number of adopters of the innovation if nodes $S^*_k$ adopt initially. One can then give free samples of a product to nodes $S^*_k$, for example.

The propagation of information through a social network has also been studied from a game-theoretic perspective, in which one postulates an increase in utility for players who adopt the new innovation or learn the new information if enough of their friends have also adopted. For example, each player chooses whether to switch from videotape to DVDs; a person with friends who have made the same choice can benefit by borrowing movies. In blogspace, sharing discussion of a new and interesting topic with others in one's immediate social circle may bring pleasure or even increased status.

One game-theoretic approach considers a setting such as the following coordination game: in every time step, each node in a social network chooses a type {0, 1}. Players of type 1 have adopted the meme. Each player i receives a positive payoff for each of its neighbors that has the same type as i, in addition to an intrinsic benefit that i derives from its type. Further, each player may have a distinct utility for adopting, depending on his inherent interest in the topic. Suppose that all but a small number of players initially have type 0. This game-theoretic approach explores the question of whether players of type 1 can "take over" the graph if every node chooses to switch to type 0 with probability increasing as the number of the neighbors of i that are of type 0 increases.

There has also been work in the economics community on models of the growth of social networks when an agent u can selfishly decide to form a link with another agent v, who may have information that agent u desires to learn. There is a cost born by agent u to establish such a link, and a profit for the information that agent u learns through this link. This approach explores properties of the social network that forms under this scenario. Reference is made to V. Bala, et al., "A strategic analysis of network reliability", *Review of Economic Design*, 5:205-228, 2000 and H. Haller. et al., "Nash networks with heterogeneous agents", Working Paper Series E-2001-1, Virginia Tech, 2003.

Although the conventional technologies, analyses, and approaches to modeling transmission of information presented thus far have proven to be useful, it would be desirable to present additional improvements. Many models have been proposed to capture the methods by which the spread of infectious diseases and the spread of memes occur. Epidemiologists proceed in tracing the spread of a disease by interviewing individuals and finding reasons to believe that one person may have had contact with another.

For online discussions of topics in weblogs, however, the situation is different and conventional technologies, analyses, or approaches do not naturally apply. Given a large number of identified weblog authors, each of whom may write about several topics on any given day, a method is needed to determine without knowledge of personal relationships what patterns of topic flow exist within the data. Further, the method should find patterns within many topics of the form "Whenever person A writes about a new topic, person B is very likely to write about that topic shortly thereafter; thus person B is most likely reading what person A writes".

What is therefore needed is a system, a service, a computer program product, and an associated method for analyzing communication between parties to induce a pattern on of communication. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for inducing a pattern of communication among parties involved in communicating information. The present system focuses on the propagation of topics from one node to the next, based on the text of the node rather than hyperlinks of the node. A node represents a weblog or any other source of information such as person, a conversation, etc.

Though the advent of personal publication gives everyone the same reach, individual behavior differs dramatically. The individual dimension comprises categories of individuals based on a typical posting behavior of the individual within the life cycle of a topic. The present system utilizes a model for information diffusion based on the theory of the spread of infectious diseases. The parameters of the model capture how a new topic spreads from node to node. The present system further comprises a process to learn the parameters of the model based on real data and apply the process to real (and synthetic) node data. Consequently, the present system is able to identify particular individuals that are highly effective at contributing to the spread of "infectious" topics.

The present system utilizes a model for propagation of topics from node to node in node space that is akin to traditional models of disease propagation. Individuals become "infected" by a topic, and may then pass that topic along to others with whom they have close contact. The present system defines close contact as a directed concept, since node A may read the information of node B, but not vice versa. The present system gives a thorough understanding of how topics may travel from person to person. The present system does not have access to direct information about the source that inspired an author to post a message. Instead, the present system has access only to the surface form of the information: the sequence in which hundreds, thousands, or tens of thousands of topics spread across node space. The present system processes these sequences and extracts the most likely communication channels to explain the propagation, based on the underlying model.

A model used by the present system comprises a transmission graph. Nodes in the graph represent information sources such as, for example, blogs. The present system forms an edge between node pairs. Edges between the node pairs comprise information about how a topic propagates from one node to another node. In general, each edge indicates between node pairs the presence of information transmission, the frequency at which information is transmitted, the probability that information is copied or spread from one node to another, and optionally indicates the direction of information transmission. The present system determines an edge between node pairs in a network for each meme or topic.

A better understanding of the flow of information through networks can be a powerful tool for many applications. Recently, a number of alert-based news services have attempted to filter the large volume of online news items and identify a small number of important, high-impact stories relevant to a given topic. The explosion in the volume of news items poses a significant challenge for making these services useful. Weblogs compound this problem: while some blog postings may be sufficiently important to merit notification, it can be difficult to identify the crucial posts in high-chatter topics. Corporate press releases pose a similar problem: while some press releases are important and newsworthy, the vast majority of press releases are comparatively irrelevant marketing propaganda.

The present system enables alert-based news services to identify subtopics that are experiencing spikes. Such an approach leverages a reaction by the blogging community to external world events, as manifested by spikes in blog postings, to identify news events that are worthy of attention. The present system offers great potential through this view of the blogging community as a giant collaborative filtering mechanism built around an implicit web of trust, as manifested in propagation patterns between individuals.

The present system provides a high quality, inexpensive, and nearly real-time tool for evaluating the effectiveness and health of a company's image and image-affecting activities. The ability to perform such evaluations in the real world rather than in experimental focus groups can be a powerful and important tool for marketing, advertising, and image control. For example, a company launching a new advertising campaign can gain significant value from being able to judge and subsequently tune the effectiveness of the campaign. To the extent that the blogging community is representative of a target audience for such an advertising campaign, marketers can measure uptake of key messages by defining and tracking the appropriate topics. The topic model may be used in the development of public relations campaigns, as well.

Typically a company is required to select among a wide variety of distinct possible emphases for an advertisement or a press release. As discussed previously, high-chatter topics tend to exhibit larger spikes; thus choosing to emphasize a high-chatter topic or subtopic can increase the likelihood of the message eliciting a large reaction. The chatter level on a topic can potentially also be used for keeping tabs on the "mindshare" that a company has. High visibility companies such as Microsoft and Apple exhibit a high chatter level; tracking this chatter provides an early view of trends in share and perception.

Resonance is the fascinating phenomenon in which a massive response in the community is triggered by a minute event in the real world. It is an extremely rare phenomenon. The present system can be used to understand the source of resonance in networks such as, for example, blogspace. The observation of the spontaneous generation of order from chaos is not new. Reference is made to S. Strogatz, "*Sync: The emerging science of spontaneous order*", Hyperion, 2003. However, through access to blog data the present system can shed new insight on this type of phenomenon. A better understanding of the cause of resonance can have massive implications for marketing.

The present system may be embodied in a utility program such as a communication pattern inducing utility program. The present system provides means for the user to identify a set of input data on which the present system performs processing of communication patterns. The present system further provides means for the user to specify processing variables such as whether a communication pattern induced by the communication pattern inducing utility program comprises direction of communication. The present system further provides means for the user to specify completion criteria by which the communication pattern inducing utility program judges the communication pattern completed. The user selects the input data, specifies processing variables, specifies completion criteria, and then invokes the communication pattern inducing utility program to create a communication pattern such as, for example, a transmission graph.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Communication: the transmission of information from one party to another through audio such as, for example, verbally or through visual means such as, for example, through text or images.

Internet: A collection of interconnected public and private computer networks that are linked together with routers by a set of standards protocols to form a global, distributed network.

Meme: A unit of cultural information such as a cultural practice or idea that is transmitted verbally or by repeated action from one mind to another.

Weblog (Blog): A Web page that that serves as a publicly accessible personal journal for an individual. Typically updated daily, blogs have become a form of artistic expression, enabling anyone to personally publish a diary or a directory about a subject that interests them.

World Wide Web (WWW, also Web): An Internet client—server hypertext distributed information retrieval system.

Figure 1:
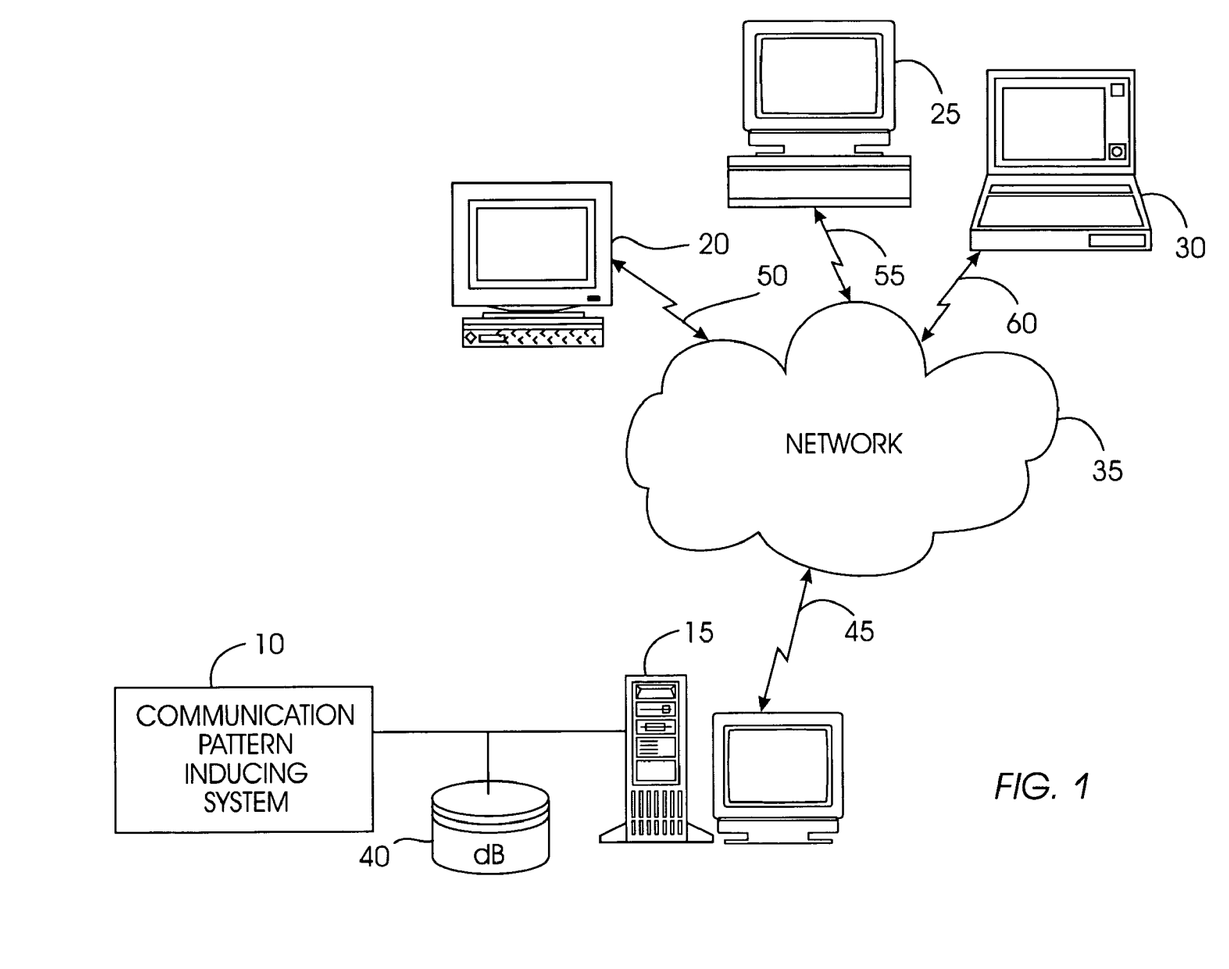
FIG. 1 is a schematic illustration of an exemplary operating environment in which a communication pattern inducing system of the present invention can be used.

FIG. 1 portrays an exemplary overall environment in which a system, a service, a computer program product, and an associated method (the "system 10") for inducing a pattern of communication among parties involved in communicating information according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 induces a pattern of communication from data stored on a database (dB) 40. Users access the induced pattern of communication. In another embodiment, users provide data to system 10; system 10 then induces a pattern of communication for the user. Output from system 10 is stored on dB 40 or on a storage repository of the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

Figure 2:
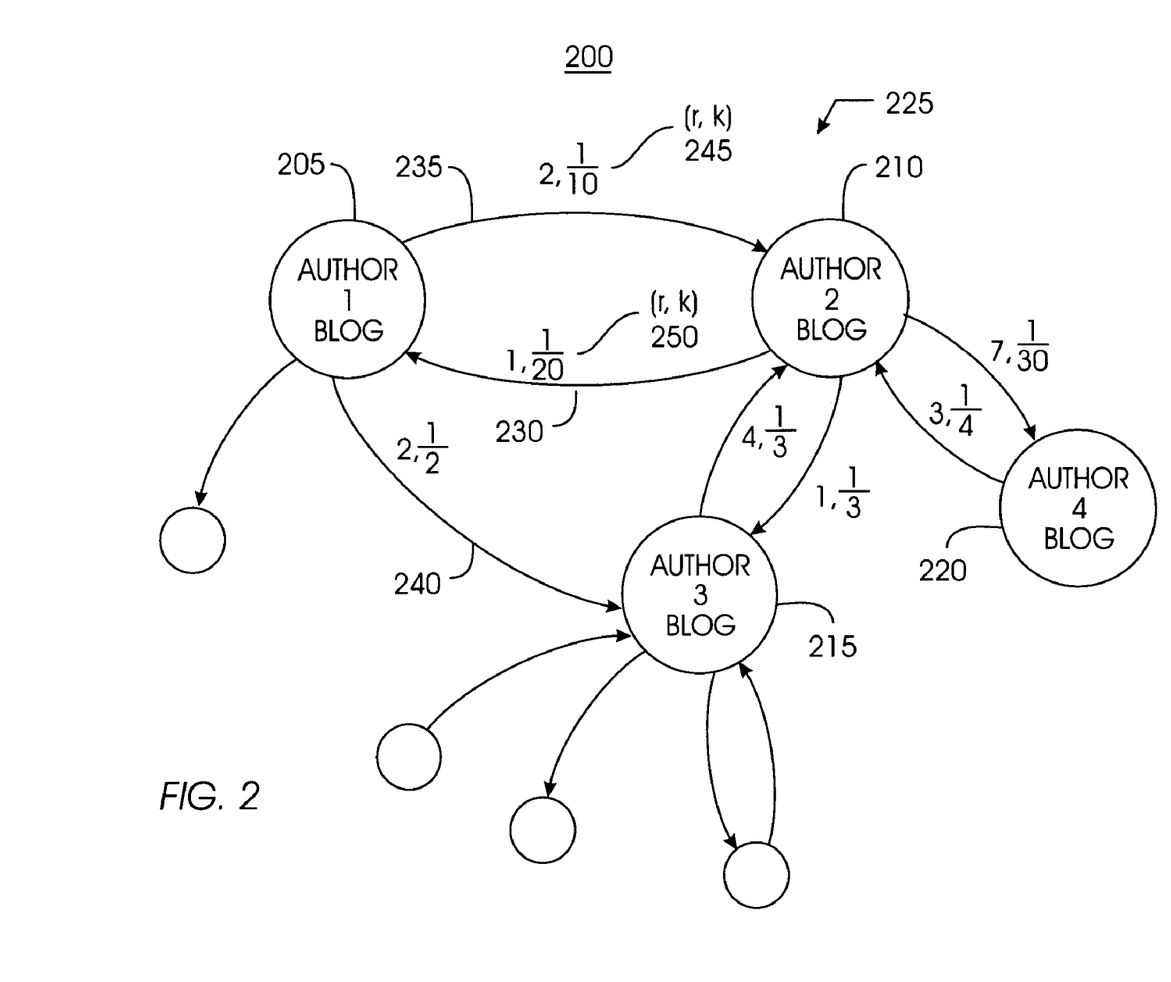
FIG. 2 is a diagram illustrating a transmission graph that may be induced by the communication pattern inducing system of FIG. 1.

FIG. 2 illustrates an exemplary network 200 illustrating communication between parties using blogs. Blogs are used in FIG. 2 for illustration purposes only; in practice, system 10 may be used to analyze many different forms of communication between parties. Network 200 comprises an author 1 blog 205, an author 2 blog 210, an author 3 blog 215, and an author 4 blog 220, collectively referenced as blogs 225. System 10 forms edges between blogs 225 such as an edge 230 and an edge 235 between the author 1 blog 205 and the author 2 blog 210.

Optional directions of edge 230 and edge 235 indicate the direction of information transmission. For example, the author 1 reads information posted on the author 2 blog 210

(edge 230). Author 2 reads information posted on the author 1 blog 205 (edge 235). An edge 240 to the author 3 blog 215 from the author 1 bloa 205 indicates that author 3 reads the author 1 blog 205. However, author 1 does not read the author 3 blog 215, as evidenced by the absence of an edge pointing from the author 3 blog 215 to the author 1 blog 205.

System 10 characterizes each edge between blogs such as blogs 225 with a frequency of transmission (r) and a probability (k) that an author writes about or propagates what they read on another blog. Edge 235 has a frequency and probability denoted as a term (r, k) 245. The term (r, k) 245 indicates that author 2 reads the author 1 blog 205 every 2 days (r) with a probability of 1/10 (k) that author 2 writes about the information presented in the author 1 blog 205. Edge 230 has a term (r, k) 250 that indicates that author 1 reads the author 2 blog 210 every day with a probability of 1/20 that author 1 writes about the information presented in the author 2 blog 210.

In general, each edge indicates the presence of information transmission, the frequency at which information is transmitted, the probability that information is copied or spread, and optionally indicates the direction of information transmission. System 10 determines an edge between nodes in a network for each meme or topic.

Figure 3:
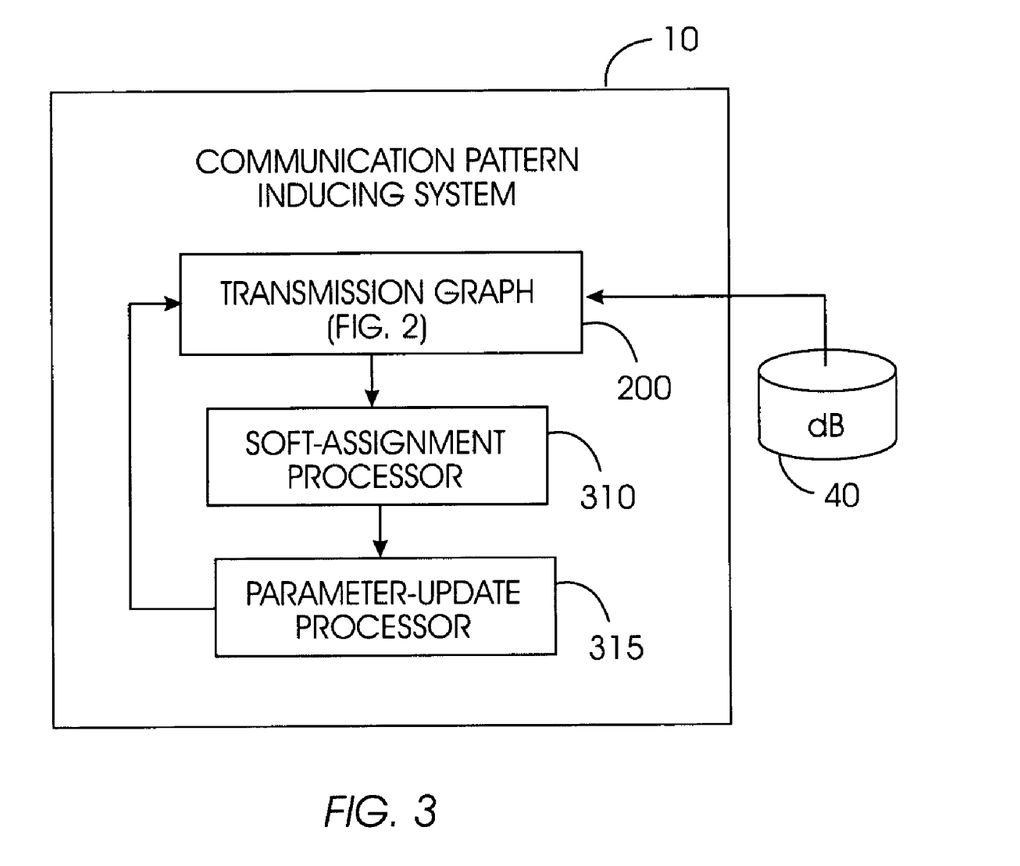
FIG. 3 is a block diagram of the high-level architecture of the communication pattern inducing system of FIG. 1.

FIG. 3 illustrates a high-level hierarchy of system 10. System 10 comprises a transmission graph 200, a soft-assignment processor 310, and a parameter-update processor 315. System 10 determines an initial guess for the transmission graph 200. The soft-assignment processor 310 computes a probability that a topic traversed an edge. The parameter-update processor 315 recomputes the frequency and the probabilities for each topic.

The transmission graph 200 can be, for example, a modified version of the independent cascade model [reference is made to J. Goldenberg, et al., "Talk of the network: A complex systems look at the underlying process of word-of-mouth", *Marketing Letters*, 12(3): 211-223, 2001], which has been generalized by the general cascade model [reference is made to D. Kempe, et al., "Maximizing the spread of influence through a social network", *In Proc. KDD*, 2003]. The transmission graph 200 comprises a set of N nodes as sources of information corresponding to, for example, authors. System 10 models the transmission of information between the set of N nodes during an episode.

At an initial state of each episode, the transmission graph 200 comprises some possibly empty set of nodes that has initiated information about a topic. At each successive state, some possibly empty set of nodes initiates information. In one embodiment, system 10 utilizes the SIR framework, in which nodes do not initiate additional instances of a topic. In another embodiment, system 10 allows nodes to repeatedly initiate instances of the same topic. The episode is over when no new instances appear for some number of time steps, the "timeout interval".

Under the independent cascade model, nodes are connected by a directed graph, where each edge (v, w) is labeled with a "copy probability" $k_{v,w}$. When node v initiates information at time t, each node w that has an arc from node v to node w initiates information about the topic at time t+1 with probability $k_{v,w}$. This influence is independent of the history of whether any other neighbors of node w have initiated information on the topic. The general cascade model can be seen as generalizing this by eliminating the assumption of independence.

The transmission graph 200 modifies the general cascade model by introducing the notion that a user may visit certain nodes frequently, and other nodes infrequently. The transmission graph 200 captures this notion with an additional edge parameter $r_{u,v}$, denoting the probability that node u reads information at node v on any given day.

Formally, propagation in system 10 occurs as follows. If a topic exists at node u on a given day (i.e., node u has previously initiated information about the topic), then system 10 computes a probability that the topic propagates from node u to a neighboring node v as follows. Node v reads the topic from node u on any given day with reading probability $r_{u,v}$. Consequently, system 10 chooses a delay from an exponential distribution with parameter $r_{u,v}$. With probability $k_{u,v}$, the node v initiates information about the topic. If node v reads the topic and chooses not to copy it, then node v never copies that topic from node u. There is only a single opportunity for a topic to propagate along any given edge.

In an embodiment, once node u has initiated information about a topic, node v becomes infected (i.e., initiates information on the topic) with probability $k_{u,v}r_{u,v}$ on any given day, but once the $r_{u,v}$ coin comes up heads, no further trials are made, as described earlier.

With the transmission graph 200 and, in particular, the reading frequency r and copy probability k of each edge, system 10 can fully establish a distribution of propagation patterns. Given a set of N nodes and a timeout interval, system 10 learns the arcs and associated probabilities from a set of episodes. Using these probabilities and an initial fragment of a new episode, system 10 can predict the propagation pattern of the new episode.

In the following, system 10 makes a "closed world assumption" that all occurrences of a topic except the first are the result of communication via edges in the network.

A "topic" as utilized by system 10 is a URL, phrase, name, or any other representation of a meme that can be tracked from page to page. System 10 gathers all node entries that contain a particular topic into a list $[(u_1, t_1), (u_2, t_2), \ldots, (u_k, t_k)]$ sorted by publication date of the information on the node, where $u_i$ is the universal identifier for node i, and $t_i$ is the first time at which node $u_i$ contained a reference to the topic. The list is further referenced herein as the "traversal sequence" for the topic.

System 10 induces the relevant edges among a candidate set of $\Theta(n^2)$ edges with limited data. System 10 makes critical use of the following observation: the fact that node A appears in a traversal sequence, and node B does not appear later in the same sequence gives evidence to system 10 about the (A, B) edge. If node B were a regular reader of information on node A with a reasonable copy probability, then on occasion memes discussed by node A should appear on node B. Consequently, system 10 gains information from both the presence and absence of entries in the traversal sequence.

System 10 utilizes an EM-like algorithm modified to induce the parameters of the transmission graph 200 [reference is made to A. Dempster, et al., "Maximum likelihood from incomplete data via the EM algorithm", *J. Royal Stat. Soc.*, 1977]. System 10 computes a "soft assignment" of each new infection to the edges that may have caused it, and then updates the edge parameters to increase the likelihood of the assigned infections. From an initial guess at the value of r and k for each edge, system 10 improves the estimate of r and k using the soft-assignment processor 310 and the parameter-update processor 315. Using the current version of the transmission graph 200, the soft-assignment processor 310 computes for each topic and each pair (u, v) the probability that the topic traversed the (u, v) edge. For fixed node u and node v, the parameter-update processor 315 recomputes $r_{u,v}$ and $k_{u,v}$ based on the posterior probabilities computed above.

The soft-assignment processor 310 is given as input the traversal sequence for a particular topic j. For each node v in the traversal sequence, the soft-assignment processor 310 considers all previous nodes u in the traversal sequence and computes the probability $p_{u,v}$ that topic j may have been copied from node u to node v, given the delay between node u and node v in the traversal sequence. Normalizing by the sum of these probabilities $p_{u,v}$, the soft-assignment processor 310 computes posteriors of a probability that each node u was the source of inspiration of node v. That is, setting $r=r_{u,k}$, $k=k_{u,k}$, and δ to be the delay in days between node u and node v in topic j:

$$p_{u,v} := \frac{r(1-r)^\delta k}{\sum_{w<v} r_{w,v}(1-r_{w,v})^{\delta_{w,v}} k_{w,v}}$$

In one embodiment, for efficiency reasons, the soft-assignment processor 310 considers only a limited number of values of node w closest to node v, and requires propagation to occur within predetermined time such as, for example 30 days.

The parameter-update processor 315 performs the following operation for each fixed node u and node v. Let $S_1$ denote the set of topics j such that topic j appeared first at node u and subsequently at node v. Further, let $S_2$ denote the set of topics j such that node u was infected with topic j but node v was never infected with the topic j.

For each topic $j \in S_1$, the parameter-update processor 315 is given as input the pair $(p_j, \delta_j)$, where $p_j$ is the posterior probability (computed as discussed previously) that node u infected node v with topic j, and $\delta_j$ is the delay in days between the appearance of the topic j in node u and in node v. For every topic $j \in S_2$, the parameter-update processor 315 is given as input the value $\delta_j$, where $\delta_j$ days elapsed between the appearance of topic j at node u and the end of the episode. The parameter-update processor 315 estimates an updated version of r and k as follows:

$$r := \frac{\sum_{j \in S_1} p_j}{\sum_{j \in S_1} p_j \delta_j}$$

$$k := \frac{\sum_{j \in S_1} p_j}{\sum_{j \in S_1 \cup S_2} Pr(r \leq \delta_j)}$$

where $Pr[a \leq b]=(1-a)(1-(1-a)^b)$ is the probability that a geometric distribution with parameter a has value ≤b. Given the values of $p_j$, the updated 1/r is the expected delay in topics copied from node u to node v, and the updated k is the ratio of the expected number of topics at node u copied by node v to the expected number of such topics read by node v.

System 10 now has an improved guess at the transmission graph 200, so the soft-assignment processor 310 recomputes posteriors, iterating until convergence. Initially, system uses the transmission graph 200 to guess how data traveled. Next, system 10 uses the guess about how data traveled to improve the transmission graph 200. Typically, the values of r and k converge within 2-5 iterations, depending on the data, to a vector of values within 1% of the limiting value under the $L_2$ norm.

Figure 4:
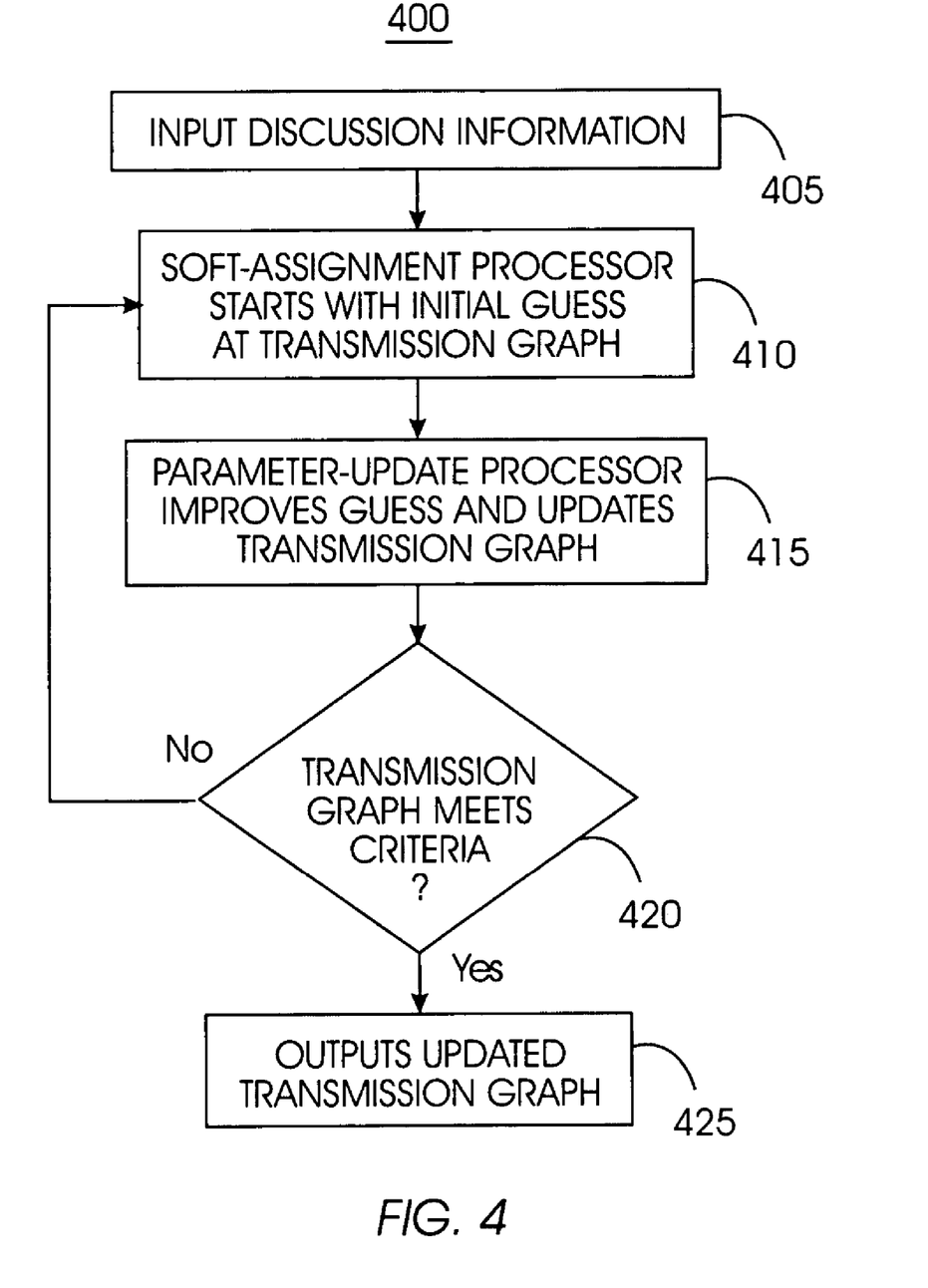
FIG. 4 is a high-level process flow chart illustrating a method of operation of the communication pattern inducing system of FIGS. 1 and 3.

FIG. 4 illustrates a high-level method 400 of operation of system 10. Discussion information is inputted to system 10 (step 405). For a network comprising blogs as nodes, an exemplary input is a traversal sequence for topics T, blogs B, and times t is of the form $T_n: B_i(t_j)$:

T1: B1(t4), B12(t13), B9(t20), . . .

In the preceding input, T1 is topic 1. Topic one occurs on blog 1 at time 4, on blog 12 at time 13, at blog 9 at time 20, etc. System 10 concurrently tracks more than one topic:

T2: B12(t19), B20(t23), B4(t29), . . .

In the preceding input, T2 is topic 2. Topic two occurs on blog 12 at time 19, on blog 20 at time 23, at blog 4 at time 29, etc.

The soft-assignment processor 310 starts with an initial guess for the transmission graph 200 (step 410). The parameter-update processor 315 improves the guess for the transmission graph 200 and updates the transmission graph 200 (step 415). System 10 determines whether the transmission graph 200 meets predetermined criteria (decision step 420). If not, system 10 repeats step 410 and step 415 until the transmission graph 200 meets the predetermined criteria (decision step 420) and outputs the updated transmission graph (step 425).

According to another embodiment, the decision block 420 is omitted so that method 400 does not perform an iterative refinement process. Rather, method 400 generates a transmission graph in all instances.

Figure 5:
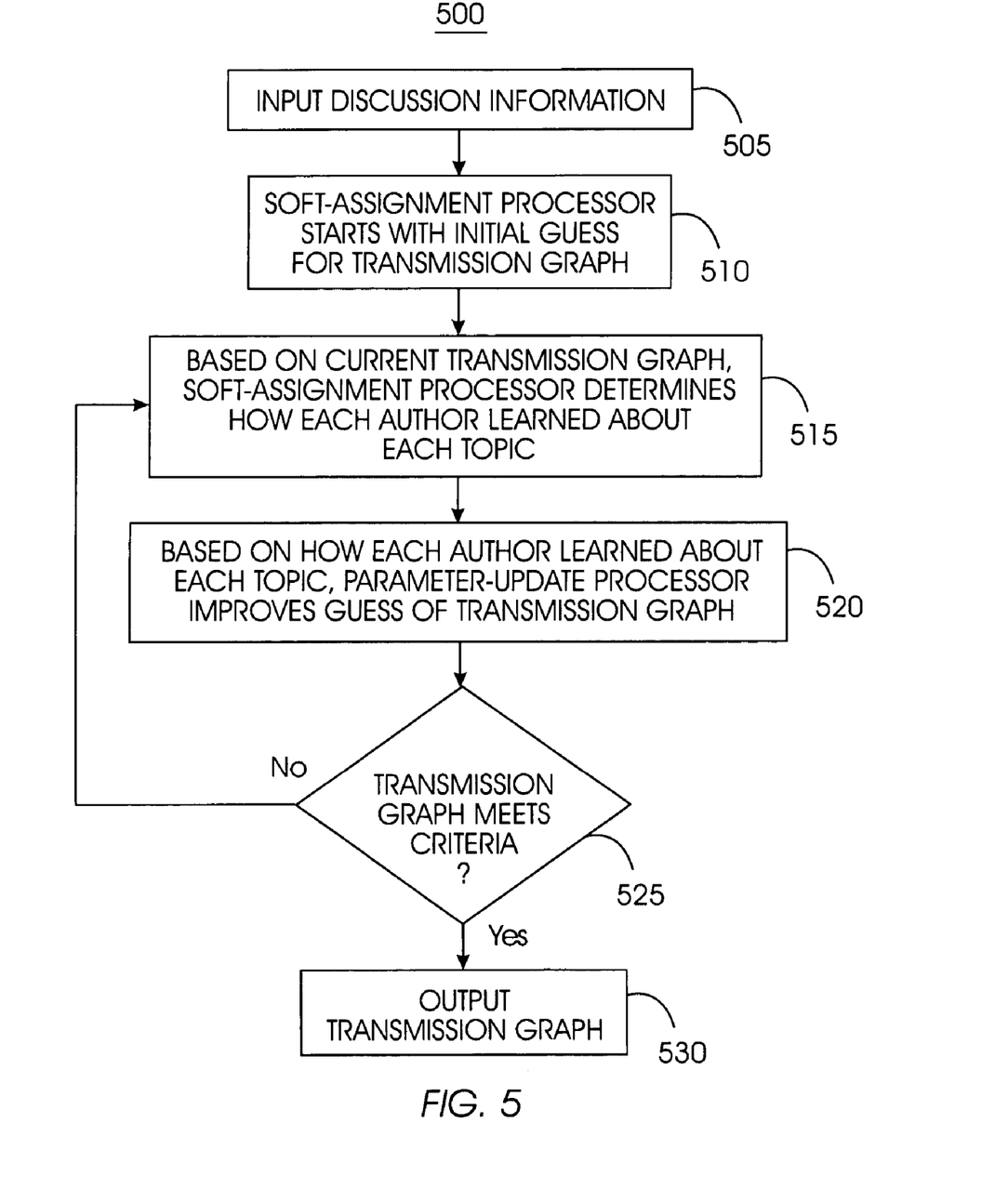
FIG. 5 is a detailed process flow chart illustrating a method of operation of an embodiment of the communication pattern inducing system of FIGS. 1 and 3.

FIG. 5 illustrates method 500 of operation of one embodiment of system 10. System 10 takes as input discussion information (step 505) in the same format as step 405. The soft-assignment processor 310 starts with an initial guess at the transmission graph 200 (step 510). Based on the current transmission graph 200, the soft-assignment processor 310 determines how each author learned about each topic (step 515). Based on how each author learned about each topic, the parameter-update processor 315 improves the guess of the transmission graph 200 (step 520). System 10 determines whether the transmission graph 200 meets predetermined criteria (decision step 525). If not, system 10 repeats step 525 and step 520 until the transmission graph 200 meets the predetermined criteria (decision step 525). System 10 outputs a transmission graph 200 (step 530).

Most blog topics do not travel exclusively through blogspace; rather, they are real-world events that are covered to some extent in traditional media. During online coverage of a topic, certain bloggers may read about the topic in other blogs and respond, while others may learn of the topic from, for example, some form of media such as a newspaper and write without reference to other blogs. In one embodiment, system 10 extends the transmission graph 200 by introducing a "real world" node. The real world node initiates information about a topic whenever that the topic is covered sufficiently in the media. Transmission probabilities and delays are handled just as before. System 10 assumes that essentially all bloggers receive input from this "real world" node.

Blogging communities can become quite large, and most people do not have the time to read more than a few blogs on any regular basis. In another embodiment, system 10 models this phenomenon either by limiting the in-degree of nodes or by allowing only some small number of in-edges to influence a particular node at any time step. System 10 extends the transmission graph 200 to support this phenomenon by adding an "attention threshold" parameter. More sophisticated models of the transmission graph 200 capture the fact that the attention threshold is a function of other episodes that are occurring at the same time. An increase in the number of concurrent episodes decreases the attention threshold for each episode. This approach can explain the phenomenon that during high-chatter events like wars or elections many other topics that may otherwise have received a lot of attention in fact received little.

As described above, the probability that a node v is infected with topic j by a node u in the transmission graph 200 depends only on the parameters $r_{u,v}$ and $k_{u,v}$. Further, the probability that a node v is infected with topic j by a node u in the transmission graph 200 is independent of the topic j. Realistically, certain topics are inherently more interesting than others and thus are more likely to be copied. In a further embodiment, system 10 introduces a "stickiness" $S_j$ of each topic j that controls the probability that the topic "sticks" with node v. (Stickiness of a topic is analogous to virulence of a disease.) The probability of infection when node v reads information initiated by node u now becomes $k_{u,v}S_j$ instead of just $k_{u,v}$.

Introducing stickiness requires minor modification for the updating of p, r, and k. To compute the stickiness $S_j$ of each topic j, system 10 can employ outside information such as, for example, empirical data on the popularity of a particular topic. Stickiness can also be learned from the transmission graph 200 using a maximum likelihood estimation.

In yet another embodiment, system 10 reflects the reality that authors routinely write additional posts on the same topic. In this embodiment, traversal sequences of the form $[(u_1, t_1), (u_1, t_2), (u_3, t_3), \ldots]$ are possible. Consequently, in estimating copy probabilities k and delays or frequency r, system 10 considers the disjoint events that $u_3$ received the information from the first instance of $u_1$ or the second instance of $u_1$. The relevant expectations are taken over multiple instances of node u, but the equations of system 10 are otherwise unchanged.

It is to be understood that the specific embodiments of the invention that have been described are merely illustrative of certain applications of the principle of the present invention. Numerous modifications may be made to the system, method, and service for inducing a pattern of communication among parties involved in communicating information described herein without departing from the spirit and scope of the present invention. Moreover, while the present invention is described for illustration purpose only in relation to the WWW, it should be clear that the invention is applicable as well to, for example, data derived from communication between parties in any format. Further, while the present invention is described for illustration purposes in relation to weblogs or written communication, it should be clear that the invention is applicable as well to, for example, verbal communication or visual communication in any format provided a topic can be derived from the communication.

What is claimed is:

1. A method of inducing a pattern of communication among a plurality of parties communicating information, comprising:
for a first episode:
receiving, for each party of a plurality of parties, information that describes a topic discussed by at least some parties of the plurality of parties and a time of occurrence of discussion;
preparing a transmission graph illustrative of the pattern of communication, wherein the transmission graph illustrates at least some of the parties as nodes and a plurality of edges that interconnect at least some of the nodes, and wherein the transmission graph establishes a pattern of distribution of propagation of discussion of the topic among the plurality of parties; and
storing the transmission graph on a storage repository; and
for a subsequent second episode:
receiving an initial fragment of propagation of discussion among the plurality of parties;
using the pattern of distribution of propagation established for the first episode and the initial fragment of propagation of discussion for the second episode, predicting a propagation pattern for the second episode; and
outputting the propagation pattern for the second episode transmission graph; and
wherein the preparing the transmission graph begins by computing a frequency of transmission of the topic and a probability that a node communicates the topic to another node; and
wherein recursively updating the transmission graph until the transmission graph meets a predetermined criterion by recomputing the frequency of transmission and probability for each one of the plurality of edges.

2. The method of claim 1, wherein outputting the transmission graph comprises outputting an updated transmission graph.

3. The method of claim 1, wherein the parties include at least one transmitting party that transmits information about the topic, and at least one receiving party that receives the information about the topic from the at least one transmitting party; and
further comprising, for certain communication paths along the transmission graph, determining a probability that the receiving party writes about the topic.

4. The method of claim 3, further comprising determining a frequency of communication from the transmitting party to the receiving party.

* * * * *